(12) United States Patent
Tian et al.

(10) Patent No.: US 12,387,095 B2
(45) Date of Patent: Aug. 12, 2025

(54) DIGITAL SIGNAL MODULATION METHOD FOR A PHOTON ARTIFICIAL INTELLIGENCE COMPUTING CHIP

(71) Applicant: United Microelectronics Center Co., Ltd, Chongqing (CN)

(72) Inventors: Ye Tian, Chongqing (CN); Yang Zhao, Chongqing (CN); Wei Wang, Chongqing (CN); Shengping Liu, Chongqing (CN); Qiang Li, Chongqing (CN); Junbo Feng, Chongqing (CN); Jin Guo, Chongqing (CN); Jianzhong Han, Chongqing (CN)

(73) Assignee: United Microelectronics Center Co., Ltd, Chongqing (CN)

( * ) Notice: Subject to any disclaimer, the term of this patent is extended or adjusted under 35 U.S.C. 154(b) by 758 days.

(21) Appl. No.: 17/774,488

(22) PCT Filed: Jul. 22, 2020

(86) PCT No.: PCT/CN2020/103537
§ 371 (c)(1),
(2) Date: May 5, 2022

(87) PCT Pub. No.: WO2021/088418
PCT Pub. Date: May 14, 2021

(65) Prior Publication Data
US 2022/0405565 A1    Dec. 22, 2022

(30) Foreign Application Priority Data
Nov. 5, 2019    (CN) .......................... 201911073083.6

(51) Int. Cl.
*G06N 3/067* (2006.01)
(52) U.S. Cl.
CPC ................................. *G06N 3/0675* (2013.01)

(58) Field of Classification Search
CPC ..................................................... G06N 3/0675
See application file for complete search history.

(56) References Cited

U.S. PATENT DOCUMENTS 11,521,055 B2 * 12/2022 Abel ..................... H04L 5/0048
11,526,742 B2 * 12/2022 Zou .......................... G06E 3/005
(Continued)

FOREIGN PATENT DOCUMENTS

| CN | 108599849 A | * | 9/2018 | ............. G06E 3/005 |
| CN | 108599865 A | * | 9/2018 | ............. H04B 10/60 |

(Continued)

OTHER PUBLICATIONS

M. A. Nahmias, T. F. de Lima, A. N. Tait, H.-T. Peng, B. J. Shastri and P. R. Prucnal, "Photonic Multiply-Accumulate Operations for Neural Networks," in IEEE Journal of Selected Topics in Quantum Electronics, vol. 26, No. 1, pp. 1-18, Jan.-Feb. 2020, doi: 10.1109/JSTQE.2019.2941485. (Year: 2020).*

(Continued)

*Primary Examiner* — Rhonda S Peace
(74) *Attorney, Agent, or Firm* — IPRTOP LLC

(57) ABSTRACT

A digital signal modulation method for a photon artificial intelligence computing chip, including: modulating one or more groups of digital electrical signals into optical signals; where the group of digital electrical signals comprises several timing signals being outputted in sequence in a channel within a fixed period; where each timing signal has the same base clock and signal time length; where each timing signal conveying N-bit digital information has $2^N-1$ base clocks, the number of the base clocks of a high-level signal or the number of a digital signal "1" in the timing signal is a signal value of the timing signal, and the signal value is equal to a value of the N-bit digital information being transmitted; and where the timing signal is a modulating signal for converting the electrical signal to the optical (Continued)

signal. Compared with the existing calculation scheme based on digital-to-analog conversion and analog signal modulation, the calculation scheme in the present invention avoids using a digital-to-analog converter with a high cost and power consumption, can be directly connected with the digital signals of the electronic chip, and avoids quantization error during the digital-to-analog conversion of digital signals.

13 Claims, 3 Drawing Sheets

(56) References Cited

U.S. PATENT DOCUMENTS

| 2019/0318233 A1 | 10/2019 | Abel et al. | |
| 2019/0318236 A1* | 10/2019 | Zou | G06N 3/08 |
| 2022/0405565 A1* | 12/2022 | Tian | G06N 3/0675 |

FOREIGN PATENT DOCUMENTS

| CN | 110852431 | | 2/2020 | | |
| CN | 110852431 A | * | 2/2020 | ......... | G06N 3/0675 |

OTHER PUBLICATIONS

Y. Wang, L. Wu, C. Ban, J. Yang, X. Jin and Y. Wang, "Silicon Neuron Device With Neuronal Oscillation Behavior Based on Light Pulse Modulation," in IEEE Transactions on Electron Devices, vol. 71, No. 3, pp. 1858-1864, Mar. 2024, doi: 10.1109/TED.2024.3350557. (Year: 2024).*

* cited by examiner

DIGITAL SIGNAL MODULATION METHOD FOR A PHOTON ARTIFICIAL INTELLIGENCE COMPUTING CHIP

CROSS REFERENCE TO RELATED APPLICATION

The present application claims the benefit of priority to Chinese Patent Application No. CN 201911073083.6, entitled "A DIGITAL SIGNAL MODULATION METHOD FOR A PHOTON ARTIFICIAL INTELLIGENCE COMPUTING CHIP", filed with CNIPA on Nov. 5, 2019, the disclosure of which is incorporated herein by reference in its entirety.

FIELD OF TECHNOLOGY

The present invention relates to the technical field of optical computing, in particular to a digital signal modulation method for a photon artificial intelligence computing chip.

BACKGROUND

Deep Learning (DL) is one of the technical and research fields of machine learning. Through establishing artificial neural networks (ANNs) with a hierarchical structure, artificial intelligence is realized in computing systems (see Lecun, Y., Bengio, Y., Hinton, G., et al. (2015) Deep Learning. Nature, 521, 436). Deep learning proposes a method for computers to automatically learn pattern features, and integrates feature learning into the process of building models, thereby reducing the incompleteness caused by artificial designed features. In recent years, due to the development of big data, the substantial improvement of the computing capacity of the computer, and the breakthrough of the algorithm itself, deep learning has developed rapidly. Gratifying results have been achieved in the fields of computer vision, natural language processing, image and video optimization, automatic driving, medical diagnosis, and so on. Meanwhile, the expanding computational demand generated by deep learning has contributed to the continued evolution of processing architectures. New architectures that can be used for specific computing are proposed, such as neural network processing unit (NPU), quantum computing, and computing architecture based on photonic circuits which is the latest computing concept.

Compared with other architectures, photonic circuits are more suitable for linear operation and have the advantages of ultra-high bandwidth and ultra-low energy consumption. In 2017, researchers at the Massachusetts Institute of Technology proposed a typical photon neural network chip (see Y. Shen, et al. "Deep learning with coherent nanophotonic circuits," Nat. Photonics 11,441 (2017).). This chip uses the SVD algorithm to decompose an arbitrary matrix into two unitary matrices and one diagonal matrix and then uses an array of Mach-Zehnder interferometer (MZI) to simulate these three matrices, thus realizing the multiplication calculation of fully-optical arbitrary matrices, which provides a photonics solution for accelerating of the calculation of fully connected neural networks. At the same time, the parts of storage, control, nonlinear calculation, and the like in which the photonic circuits do not have the intrinsic advantage are placed in an external circuit, and a neural network with ideal intelligent functions is realized through photoelectric integration. However, such a chip uses analog signals for optical modulation and computation (see B, Hengameh, et al. "On-Chip Optical Convolutional Neural Networks" arXiv: 1808.03303 (2018).). Therefore, there are problems of low accuracy, poor anti-interference performance, and high dynamic range requirements for electro-optical modulators and optical detectors. In addition, AD/DA conversion is required when communicating with digital chips such as FPGA, which additionally brings quantization error and increases system cost. Since the DA conversion before modulation of electrical signals and optical signals restricts the speed of the system, high-speed and high-precision DA converters are expensive, and there is a risk of an embargo on high-precision digital-to-analog converters in terms of product iteration and scheme design, it is an effective idea that converting the analog signals into digital signals as the modulation method, which can increase the accuracy and stability of the entire photon neural network chip and provide development for the photon neural network chip. Further, considering photoelectric products are becoming abundant, and there are diversified requirements for the modulation conversion of electrical signals to optical signals and the transmission of signals, it is necessary to provide a new modulation method for the conversion of electrical signals to optical signals.

SUMMARY

The present invention provides a digital signal modulation method for a photon artificial intelligence computing chip. Input requirements or input condition restrictions of some photon products are softened, and the anti-interference performance of the system is improved through digital signal modulation. The present disclosure adopts the following technical solutions:

A digital signal modulation method for a photon artificial intelligence computing chip, comprising: modulating one or more groups of digital electrical signals into optical signals; where the group of digital electrical signals comprises several timing signals being outputted in sequence within a fixed period; where each timing signal has the same base clock and signal time length; where each timing signal conveying N-bit digital information has $2^N-1$ base clocks, the number of the base clocks of a high-level signal or a digital signal "1" in the timing signal is a signal value of the timing signal, and the signal value is equal to a value of the N-bit digital information being transmitted; and where the timing signal is a modulating signal for converting the electrical signal to the optical signal.

In an embodiment, a group of the digital electrical signals is configured to convey the information from a data block and to convert the information from the transmitted data block into an information block through the timing signals, and the data block and the information block are arrays or matrices.

In an embodiment, one data block is a signal matrix with a single column and multiple rows, the signal matrix contains the values of the respective timing signals in the group of the digital electrical signals conveying the information from the data block and the signal values of adjacent timing signals correspond to the data in adjacent rows of the signal matrix.

In an embodiment, the signal matrix is converted into a modulation matrix through the timing signals in the group of digital electrical signals, and the modulation matrix contains the timing digital signal values of each timing signal in the group of digital electrical signals that are represented as the signal matrix.

In an embodiment, the timing digital signal values of each timing signal are placed in the same row of the modulation matrix, and the timing digital signal values of adjacent timing signals are placed in adjacent columns of the modulation matrix.

In an embodiment, after multiplying the modulation matrix by a transfer matrix A, the data in the same row of the resulting matrix is added up to reflect the data in the corresponding row of the matrix obtained by multiplying an information matrix by the same transfer matrix A.

In an embodiment, the fixed period is an integer multiple of the signal time length of the timing signals.

In an embodiment, there is no low-level timing digital signal between any two high-level timing digital signals in the same timing signal.

In an embodiment, a plurality of the groups of digital electrical signals are outputted in serial or parallel, and the timing signals in a group of digital electrical signals are outputted in serial or parallel.

The present invention further provides a digital modulator comprising a PWM module, where the PWM module outputs the group of digital electrical signals obtained from the digital signal modulation method for a photon artificial intelligence computing chip as described above.

In an embodiment, the digital modulator further comprises a light-emitting unit, where the input of the light-emitting unit is connected to the output of the PWM module to convert the electrical signals of the group of digital electrical signals into optical signals.

The present invention further provides a system based on a photon neural network chip, comprising a transmitter, a photon neural network chip, and a receiver that are connected sequentially, where the transmitter comprises the digital modulator described above.

In an embodiment, the receiver comprises a photodetector, a signal amplifier, an integrator, and an analog-to-digital converter that are connected sequentially.

The present invention has the following beneficial effects: the modulation matrix obtained through a neural network in the present invention replaces the original analog-to-digital converter which is the input of the photon chip, reduces power consumption, as well as improves the accuracy and precision of modulation. The requirements for the dynamic range of the electro-optical modulator and the photodetector are greatly reduced, thus increasing the accuracy and stability of the entire photon neural network chip. The digitalization improvement also softens the input requirements or input conditions restrictions of some photonic products including the photon neural network chip and improves the anti-interference performance of the system.

DETAILED DESCRIPTION

The scheme is further described in conjunction with the accompanying figures.

A digital signal modulation method for a photon artificial intelligence computing chip, including: modulating one or more groups of digital electrical signals into optical signals; where the group of digital electrical signals comprises several timing signals being outputted in sequence within a fixed period; where each timing signal has the same base clock and signal time length; where each timing signal conveying N-bit digital information has $2^N-1$ base clocks, the number of the base clocks of a high level signal or a digital signal "1" in the timing signal is a signal value of the timing signal and the signal value is equal to a value of the N-bit digital information being transmitted; and where the timing signal is a modulating signal for converting the electrical signal to the optical signal. Each group of digital electrical signals is used to convey the information from a data block and to convert the information from the transmitted data block into an information block using the timing signals; the data block and the information block are arrays or matrices; each data block is a signal matrix with a single column and multiple rows; the signal matrix contains the values of the respective timing signals in the group of digital electrical signals conveying the information from the data block, and the signal values of adjacent timing signals correspond to the data in adjacent rows of the signal matrix.

Figure 1:
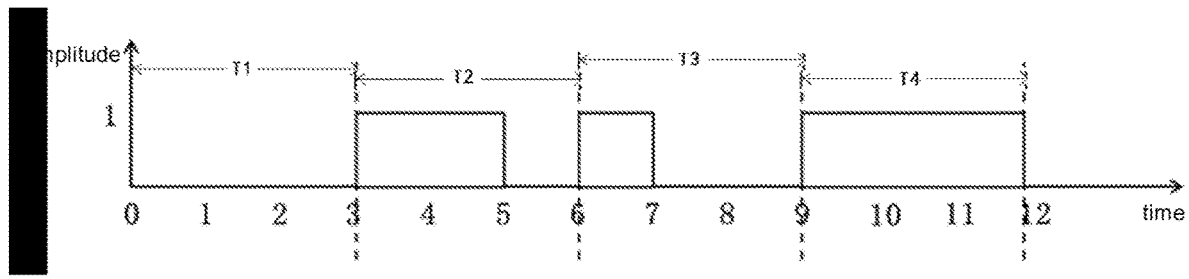
FIG. 1 shows a timing diagram of an electronic signal group according to an embodiment of the present disclosure.

A plurality of the groups of digital electrical signals are outputted in serial or parallel, and the timing signals in one group of digital electrical signals are outputted in serial or parallel. In FIG. 1, a group of digital electrical signals contains four timing signals named T1-T4, and each timing signal conveys 2 bit of digital information and occupies 3 base clocks. The timing lengths of T1-T4 are all equal, and each timing signal contains a base clock having the same duration. The signal time length of all the timing signals equals 3 base clocks. As seen in the figure, the timing signals are presented in the form of PWM digital signals. A group of digital electrical signals is used to convey the information from a data block, and the information transmitted from the data block is converted into the information block through the timing signals. The data block and the information block are arrays or matrices, and each data block is a signal matrix with a single column and multiple rows. The signal matrix contains the values of the respective timing signals in the group of digital electrical signals conveying the information from the data block, and the signal values of adjacent timing signals correspond to the data in adjacent rows of the signal matrix. The fixed period is an integer multiple of the signal time length of the timing signals to ensure signal transmission efficiency.

Specifically, in the T1 period, the number of base clocks occupied by the high-level signal or the number of a digital signal value of "1" is 0, therefore the signal value of the timing signal within the T1 period is 0. The digital information transmitted by the timing signal within the T1 period is 0, and the timing digital signal value of its PWM digital signal is "000".

In the T2 period, the number of base clocks occupied by the high-level signal or the number of the digital signal value of "1" is 2, therefore the signal value of the timing signal within the T2 period is 2. The digital information transmitted by the timing signal within the T2 period is 2, and the timing digital signal value of its PWM digital signal is "110".

In the T3 period, the number of base clocks occupied by the high-level signal or the number of the digital signal value of "1" is 1, therefore the signal value of the timing signal within the T3 period is 1. The digital information transmitted by the timing signal within the T3 period is 1, and the timing digital signal value of its PWM digital signal is "100".

In the T4 period, the number of base clocks occupied by the high-level signal or the number of the digital signal value of "1" is 3, therefore the signal value of the timing signal within the T4 period is 3. The digital information transmitted by the timing signal within the T4 period is 3, and the timing digital signal value of its PWM digital signal is "111".

Figure 2:
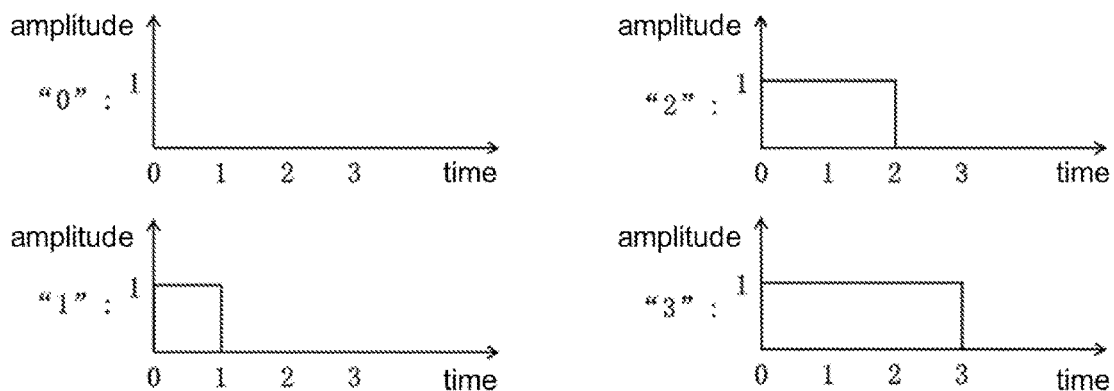
FIG. 2 shows a schematic diagram of timing signals corresponding to the signals "0", "1" "2", and "3".

Although FIG. 1 only shows the four timing signals named T1-T4 are outputted serially in the same channel, they can be outputted simultaneously (in parallel) in multiple channels. This embodiment takes a 4*4 matrix as an example to illustrate matrix operation $$M * \begin{bmatrix} x1 \\ x2 \\ x3 \\ x4 \end{bmatrix},$$

where 4 input signals are defined as x1, x2, x3, x4, i.e. the signal matrix is $$\begin{bmatrix} x1 \\ x2 \\ x3 \\ x4 \end{bmatrix},$$

and M represents a 4*4 matrix defined by a photonic neural network. Generally, the "0", "2", "1" and "3" represented by the four timing signals T1-T4 in FIG. 1 are inputted using four channels (in parallel), that is, within the signal time length which occupies three base clocks, signals of the four channels are modulated simultaneously employing the way as shown in FIG. 2 and are represented as the signal matrix $$\begin{bmatrix} 0 \\ 2 \\ 1 \\ 3 \end{bmatrix}.$$

Specifically, the signal matrix is converted into a modulation matrix using the timing signals in the group of digital electrical signals. The modulation matrix contains the timing digital signal values of each timing signal in the group of digital electrical signals conveying the signal matrix. The timing digital signal values of each timing signal in the same channel are placed in the same row of the modulation matrix, and the timing digital signal values of adjacent timing signals are placed in adjacent columns of the modulation matrix. In this embodiment, the signal matrix $$\begin{bmatrix} 0 \\ 2 \\ 1 \\ 3 \end{bmatrix}$$

is converted into a modulation matrix $$\begin{bmatrix} 0 & 0 & 0 \\ 1 & 1 & 0 \\ 1 & 0 & 0 \\ 1 & 1 & 1 \end{bmatrix}$$

using the timing signals in the group of digital electrical signals.

The present invention further provides a digital modulator comprising a PWM module and a light-emitting unit, where the PWM module outputs the group of digital electrical signals. The input of the light-emitting unit is connected to the output of the PWM module to convert the electrical signals of the group of digital electrical signals into optical signals.

Figure 3:
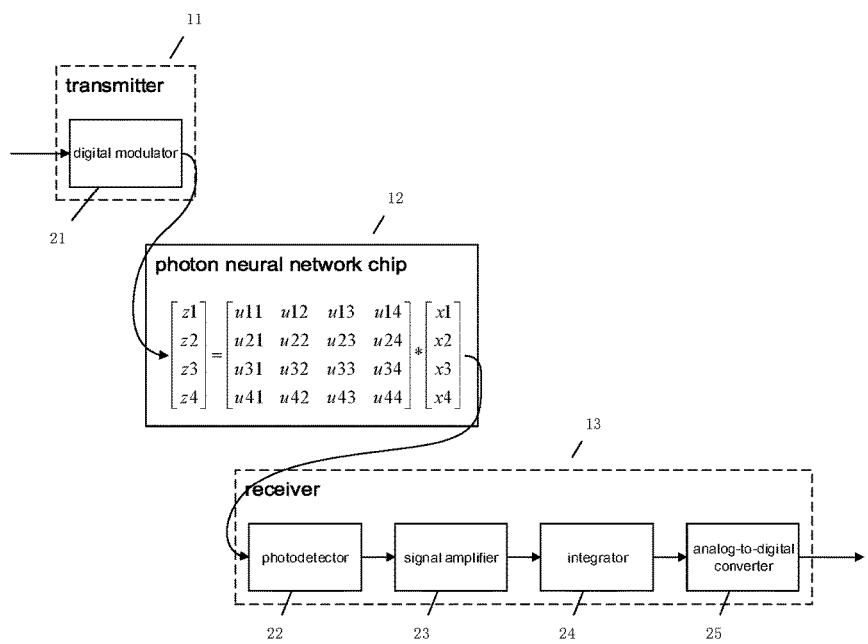
FIG. 3 shows a schematic diagram of a system architecture for a 4*4 matrix operation based on a photon neural network chip in an embodiment.

The present invention further provides a system based on a photon neural network chip. As shown in FIG. 3, the system comprises a transmitter 11, a photon neural network chip 12, and a receiver 13 that are connected sequentially, where the transmitter 13 comprises the digital modulator described above, the receiver comprises a photodetector 22, a signal amplifier 23, an integrator 24 and an analog-to-digital converter 25 that are connected sequentially.

In FIG. 3, the photon neural network chip 12 is used to perform matrix operations on data (see Y. Shen, et al. "Deep learning with coherent nanophotonic circuits," Nat. Photonics 11, 441 (2017).), and the amplitude of the output signal is the result of a matrix operation of the amplitude of the corresponding input signal. In this embodiment, the transfer matrix of the photon neural network chip 12 is $$A = \begin{bmatrix} u11 & u12 & u13 & u14 \\ u21 & u22 & u23 & u24 \\ u31 & u32 & u33 & u34 \\ u41 & u42 & u43 & u44 \end{bmatrix},$$

and the modulation matrix generated by the digital modulator via processing the signal matrix $$\begin{bmatrix} x1 \\ x2 \\ x3 \\ x4 \end{bmatrix}$$

is inputted to the photon neural network chip, after which the obtained output is $$\begin{bmatrix} z1 \\ z2 \\ z3 \\ z4 \end{bmatrix}$$

(the obtained four output signals are z1, z2, z3, and z4). The results of the following matrix multiplication operation can be obtained using the way shown in FIG. 3.

$$A * \begin{bmatrix} x1 \\ x2 \\ x3 \\ x4 \end{bmatrix}$$

In an embodiment, a transfer matrix is $$\begin{bmatrix} 1 & 1 & 3 & 5 \\ 2 & 3 & 2 & 4 \\ 2 & 3 & 4 & 5 \\ 5 & 3 & 1 & 1 \end{bmatrix},$$

so the result of the multiplication operation of the transfer matrix and the signal matrix $$\begin{bmatrix} 0 \\ 2 \\ 1 \\ 3 \end{bmatrix}$$

should be:

$$\begin{bmatrix} 1 & 1 & 3 & 5 \\ 2 & 3 & 2 & 4 \\ 2 & 3 & 4 & 5 \\ 5 & 3 & 1 & 1 \end{bmatrix} * \begin{bmatrix} 0 \\ 2 \\ 1 \\ 3 \end{bmatrix} = \begin{bmatrix} 20 \\ 20 \\ 25 \\ 10 \end{bmatrix}.$$

Figure 4:
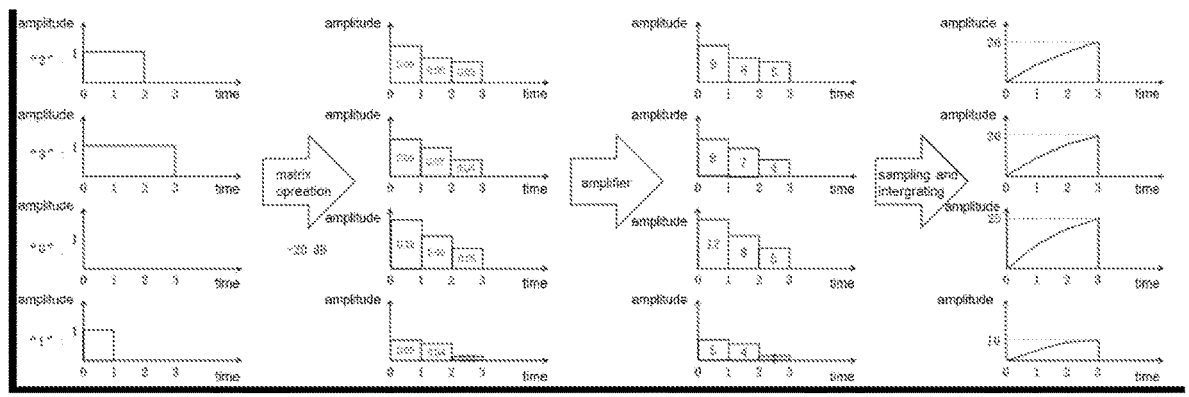
FIG. 4 shows a diagram of the variation of a 4-channel signal in the modulation in an embodiment.

The following is to specify how to complete the above matrix multiplication operation based on the PWM digital signal modulation by combining FIG. 3 and FIG. 4. The signal matrix $$\begin{bmatrix} 0 \\ 2 \\ 1 \\ 3 \end{bmatrix}$$

processed by the digital modulator generates the modulation matrix $$\begin{bmatrix} 0 & 0 & 0 \\ 1 & 1 & 0 \\ 1 & 0 & 0 \\ 1 & 1 & 1 \end{bmatrix},$$

therefore the matrix multiplication operation as shown in FIG. 3 corresponds to the multiplication of the transfer matrix and the modulation matrix, i.e.

$$\begin{bmatrix} 1 & 1 & 3 & 5 \\ 2 & 3 & 2 & 4 \\ 2 & 3 & 4 & 5 \\ 5 & 3 & 1 & 1 \end{bmatrix} * \begin{bmatrix} 0 & 0 & 0 \\ 1 & 1 & 0 \\ 1 & 0 & 0 \\ 1 & 1 & 1 \end{bmatrix} = \begin{bmatrix} 9 & 6 & 5 \\ 9 & 7 & 4 \\ 12 & 8 & 5 \\ 5 & 4 & 1 \end{bmatrix}.$$

Considering the consumption of the signal in the photon neural network chip 12, the actual amplitude will be lower than the calculated result. In FIG. 4, assuming that the consumption of the signal in the photon neural network chip 12 is 20 dB, then the signal output from the photon neural network chip 12 is $$\begin{bmatrix} 0.09 & 0.06 & 0.05 \\ 0.09 & 0.07 & 0.04 \\ 0.12 & 0.08 & 0.05 \\ 0.05 & 0.04 & 0.01 \end{bmatrix}.$$

The receiver 13 in FIG. 3 is configured to receive the matrix calculation results from the photon neural network chip 12 and convert them into electronic digital signals, which are then used for subsequent storage and other operations.

The photodetector 22 is configured to receive the calculation results (optical signals) of the photon neural network chip 12 and convert them into electrical signals.

The signal amplifier 23 is configured to amplify the electrical signals outputted from the photodetector 22, thus compensating for the consumption of the signals in the photon neural network chip 12. The variation of the signals before and after the signal amplifier 23 can be seen in FIG. 4. In an embodiment, the magnification of the signal amplifier is set as 100 times, then the corresponding variation of the signals before and after the signal amplifier 23 can be seen in FIG. 4, and the signal outputted from the signal amplifier 23 is $$\begin{bmatrix} 9 & 6 & 5 \\ 9 & 7 & 4 \\ 12 & 8 & 5 \\ 5 & 4 & 1 \end{bmatrix}.$$

The integrator 24 is configured to take samples and integrate the electrical signals outputted from signal amplifier 23 so that the electrical signals outputted from the signal amplifier 23 are converted from PWM digital signals after calculation into analog signals with corresponding amplitude. In an embodiment, the variation of the signals before and after the integrator 24 is shown in FIG. 4. The integrator 24 performs sampling and integration every 3 clocks, and the output signals are the accumulation of the signals within these 3 clocks, i.e., the sum of these 3 signals (e.g., the sum of the signals in the first row of the modulation matrix outputted from the signal amplifier is: 9+6+5=20). The signal outputted from the signal amplifier 23 is $$\begin{bmatrix} 20 \\ 20 \\ 25 \\ 10 \end{bmatrix},$$

which is in perfect agreement with the theoretical result of the 4*4 matrix operation processed by the photon neural network chip 12. It is proved that after multiplying the modulation matrix by the transfer matrix A, the sum of the data in the same row of the resulting matrix is equal to the data in the corresponding row of the matrix obtained by multiplying the information matrix by the same transfer matrix A. In an embodiment, there is no low-level timing digital signal between any two high-level timing digital signals in the same timing signal, thus facilitating the identification of the signals. In practice, the high-level signals can appear before the low-level signals, appear after the low-level signals, or appear alternatively with the low-level signals. Since the results for utilization are the sum of the data in the same row, even if the high-level signals alternate with the low-level signals, only different columns in the resulting matrix are exchanged, which does not affect the sum of the data in the same row.

The analog-to-digital converter 25 is configured to convert the analog signals outputted from the integrator 24 into the digital signals, which are then used for subsequent storage and other operations.

Figure 5:
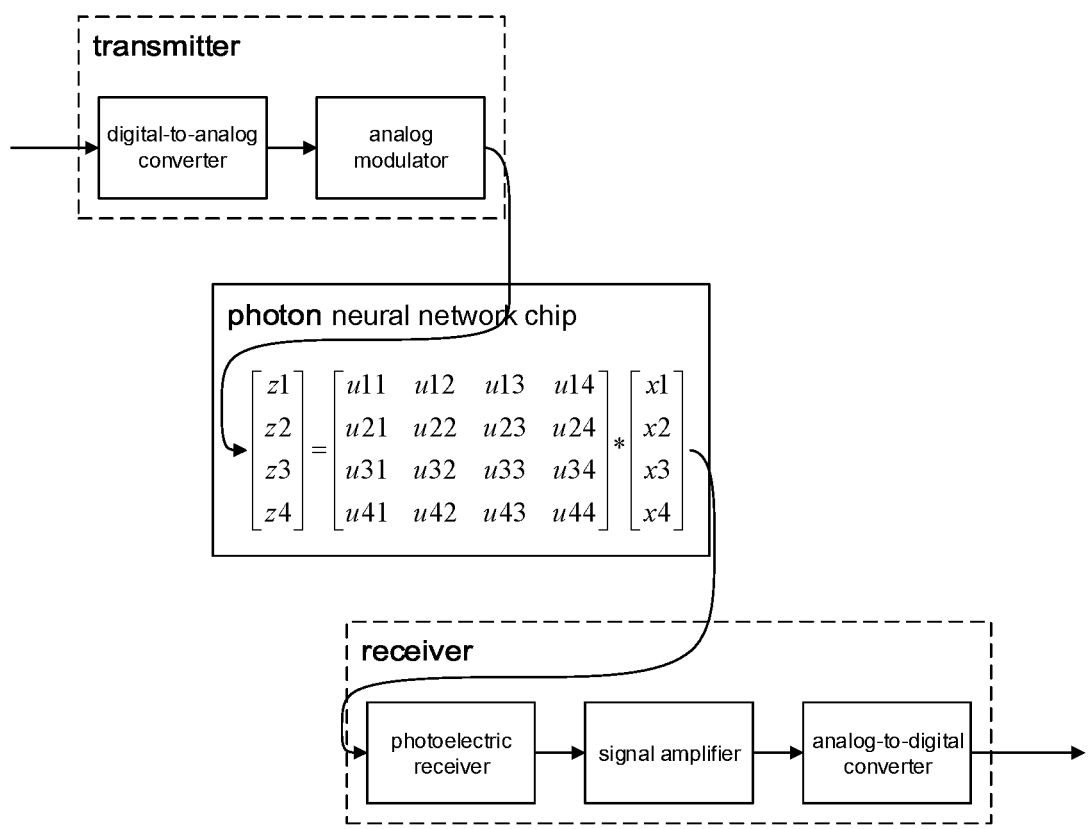
FIG. 5 shows an architecture diagram of an existing conventional analog signal modulation scheme.

The PWM digital signal modulation of the present invention can be applied to photon neural network calculations with arbitrary precision. Compared with the existing calculation scheme based on digital-to-analog conversion and analog signal modulation as shown in FIG. 5, the calculation scheme in the present invention avoids using a digital-to-analog converter with a high cost and power consumption and can be directly connected with the digital signals of the electronic chip. In addition, the calculation scheme in the present invention avoids quantization error during the digital-to-analog conversion of digital signals, and greatly reduces the requirements for the dynamic range of electro-optical modulator and optical detector, thus increasing the accuracy and stability of the whole photon neural network chip. The calculation scheme in the present invention provides an effective idea for the development of different optical products (eg. photon neural network chips) or systems.

Finally, it should be noted that the above embodiments are only used to illustrate the technical schemes of the present disclosure without limitation. Although the present disclosure has been described in detail regarding the embodiments, those skilled in the art should understand that modifications or equivalent substitutions can be made to the technical schemes of the present disclosure without departing from the spirit and scope of the technical schemes of the present disclosure, and should be covered by the scope of the claims of the present disclosure.

What is claimed is:

1. A digital signal modulation method for a photon artificial intelligence computing chip, comprising modulating one or more groups of digital electrical signals into optical signals;

wherein the group of digital electrical signals comprises a number of timing signals being outputted in sequence within a fixed time period;

wherein each timing signal has the same base clock and signal time length;

wherein each timing signal conveying N-bit digital information has $2^N-1$ base clocks, the number of the base clocks pertaining to a high level signal or a digital signal "1" in the timing signal is a signal value of the timing signal and the signal value is equal to a value of the N-bit digital information being transmitted; and wherein the timing signal is a modulating signal for converting the electrical signal to the optical signal.

2. The digital signal modulation method for a photon artificial intelligence computing chip according to claim 1, wherein one group of the digital electrical signals is configured to convey the information from one data block and to convert the information from the transmitted data block into an information block by means of the timing signals, and the data block and the information block are arrays or matrices.

3. The digital signal modulation method for a photon artificial intelligence computing chip according to claim 2, wherein one data block is a signal matrix with a single column and multiple rows, the signal matrix contains the values of the respective timing signals in the group of digital electrical signals conveying the information from the data block, and the signal values of adjacent timing signals correspond to the data in adjacent rows of the signal matrix.

4. The digital signal modulation method for a photon artificial intelligence computing chip according to claim 3, wherein the signal matrix is converted into a modulation matrix by means of the timing signals in the group of digital electrical signals, and the modulation matrix contains the timing digital signal values of each timing signal in the group of digital electrical signals conveying the signal matrix.

5. The digital signal modulation method for a photon artificial intelligence computing chip according to claim 3, wherein each of the timing digital signal values of the same timing signal are placed in the same row of the modulation matrix, and the timing digital signal values of adjacent timing signals are placed in adjacent columns of the modulation matrix.

6. The digital signal modulation method for a photon artificial intelligence computing chip according to claim 4, wherein after multiplying the modulation matrix by a transfer matrix A, the data in the same row of the resulting matrix is added up to reflect the data in the corresponding row of the matrix obtained by multiplying an information matrix by the same transfer matrix A.

7. The digital signal modulation method for a photon artificial intelligence computing chip according to claim 1, wherein the fixed time period is an integer multiple of the signal time length of the timing signals.

8. The digital signal modulation method for a photon artificial intelligence computing chip according to claim 1, wherein there is no low level timing digital signal between any two high level timing digital signals in the same timing signal.

9. The digital signal modulation method for a photon artificial intelligence computing chip according to claim 1, wherein a plurality of the groups of digital electrical signals are outputted in serial or parallel, and the timing signals in a group of digital electrical signals are outputted in serial or parallel.

10. A digital modulator, comprising a PWM module, wherein the PWM module outputs the group of digital electrical signals obtained from the digital signal modulation method for a photon artificial intelligence computing chip according to claim 1.

11. The digital modulator according to claim 10, further comprising a light emitting unit, wherein the input of the light emitting unit is connected to the output of the PWM module to convert the electrical signals in the group of digital electrical signals into optical signals.

12. A system based on a photon neural network chip, comprising a transmitter, a photon neural network chip, and a receiver that are connected sequentially, wherein the transmitter comprises the digital modulator according to claim 11.

13. The system based on a photon neural network chip according to claim 12, wherein the receiver comprises a photodetector, a signal amplifier, an integrator, and an analog-to-digital converter that are connected sequentially.

* * * * *